US012737266B2

(12) United States Patent
Ho et al.

(10) Patent No.: US 12,737,266 B2
(45) Date of Patent: Sep. 15, 2026

(54) CONTINUOUS DATABASE LOCKING DURING DATABASE RECONFIGURATION

(71) Applicant: ORACLE INTERNATIONAL CORPORATION, Redwood Shores, CA (US)

(72) Inventors: Eugene Ho, Fremont, CA (US); Wilson Wai Shun Chan, San Francisco, CA (US); Tolga Yurek, Foster City, CA (US)

(73) Assignee: Oracle International Corporation, Redwood Shores (CA)

(*) Notice: Subject to any disclaimer, the term of this patent is extended or adjusted under 35 U.S.C. 154(b) by 0 days.

(21) Appl. No.: 18/884,962

(22) Filed: Sep. 13, 2024

(65) Prior Publication Data

US 2026/0079797 A1 Mar. 19, 2026

(51) Int. Cl.
*G06F 11/14* (2026.01)
*G06F 11/1446* (2026.01)
*G06F 16/23* (2019.01)

(52) U.S. Cl.
CPC ...... *G06F 11/1469* (2013.01); *G06F 16/2343* (2019.01)

(58) Field of Classification Search
CPC ......................... G06F 11/1469; G06F 16/2343
See application file for complete search history.

(56) References Cited

U.S. PATENT DOCUMENTS 7,200,623 B2 4/2007 Chandrasekaran et al.
7,315,910 B2 1/2008 Chan et al.
10,296,498 B2 5/2019 Yang et al.
10,809,916 B2 10/2020 Amirishetty et al.
2006/0101081 A1* 5/2006 Lin ..................... G06F 16/2343
2010/0146122 A1* 6/2010 Prince, Jr. ............. G06F 9/5083 714/E11.071
2013/0185270 A1* 7/2013 Brower ............... G06F 16/2343 707/704
2018/0060318 A1* 3/2018 Yang .................. G06F 16/2255

* cited by examiner

*Primary Examiner* — Merilyn P Nguyen
(74) *Attorney, Agent, or Firm* — Vista IP Law Group, LLP

(57) ABSTRACT

A computer program product, system, and computer implemented method for continuous database locking during database reconfiguration is provided herein. The present approach provides two different processing approaches to remaster locks that can execute in parallel. The first is an event-based lock state remastering process that executes a processing flow to ensure that all locks that need to be remastered are in fact remastered. As second is a request-based lock state remastering process that executes processing solely for the requested resource in order to quickly make the requested resource accessible. Additionally, each process is responsive to the other in the request-based lock state remastering process can continue from where the event-based lock state remastering process left the corresponding resource and the event-based lock state remastering process avoids further processing for locks that are, or have been, processed using the request-based lock state remastering process.

20 Claims, 8 Drawing Sheets

CONTINUOUS DATABASE LOCKING DURING DATABASE RECONFIGURATION

FIELD OF THE INVENTION

The present invention relates to lock mastering and, more specifically, to approaches to manage lock state remastering for lock information of a multi-node cluster.

BACKGROUND

The interconnected nature of current businesses demands continuous availability of database data. Database downtime affects performance of applications that may interact with database systems, as well as the human performance that depends on those database systems. For example, taking down database systems sustaining online banking web services will affect a user's ability to access their bank accounts and also affect customer service satisfaction. In fact, many database users have high availability requirements, such as 99.999% uptime (which is a maximum downtime per year of around 5 minutes).

Database reconfiguration is one reason that database data becomes unavailable. During database reconfiguration, new lock requests are temporarily stalled, causing the users of the database to experience a brownout. Database reconfiguration can be required for many reasons, including a new server node joining a cluster of nodes, one or more servers of the cluster getting shut down for maintenance or due to software or hardware failures, etc.

Database reconfiguration is generally implemented by freezing access to the database and scanning every lock maintained for the database (which may be on the order of a billion locks), since any one of the locks might be affected by the reconfiguration. Scanning every lock maintained for a database is time-consuming and, as such, database reconfiguration can bring a database offline for an unacceptable amount of time.

Therefore, it would be beneficial to minimize the amount of time that is needed for database reconfiguration for lock state remastering.

SUMMARY

Embodiments of the present disclosure provide a method, apparatus, and product for continuous database locking during database reconfiguration.

The approach disclosed herein generally comprises management of lock management structures. Specifically, the approaches provided herein are directed towards lock management structures where items (e.g., resources such as data) are managed using a distributed arrangement of locks. Those locks correspond to different resources and are mastered by different computing nodes in a cluster (e.g., multi-node DBMS). Each lock or resource will be mastered by one of the nodes in the cluster. When one of those nodes is removed, or a new node is added, the mastership changes (e.g., to redistribute work to a new node or to redistribute work from a failed node). However, while the remastering is taking place, and without more, the corresponding resources must be locked to avoid conflicts. The present approach provides two different processing approaches to remaster those locks. The first is an event-based lock state remastering process that executes a processing flow to ensure that all locks that need to be remastered are in fact remastered. As second is a request-based lock state remastering process that executes processing solely for the requested resource in order to quickly make the requested resource accessible. Additionally, each process is responsive to the other in the request-based lock state remastering process can continue from where the event-based lock state remastering process left the corresponding resource and the event-based lock state remastering process avoids further processing for locks that are, or have been, processed using the request-based lock state remastering process. This allows for resources to be made available before the event-based lock state remastering process is completed, and therefore helps to minimize the amount of time that is needed for database reconfiguration for lock state remastering for respective resources.

Further details of aspects, objects and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. To better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

DETAILED DESCRIPTION OF THE EMBODIMENTS OF THE DISCLOSURE

Figure 1:
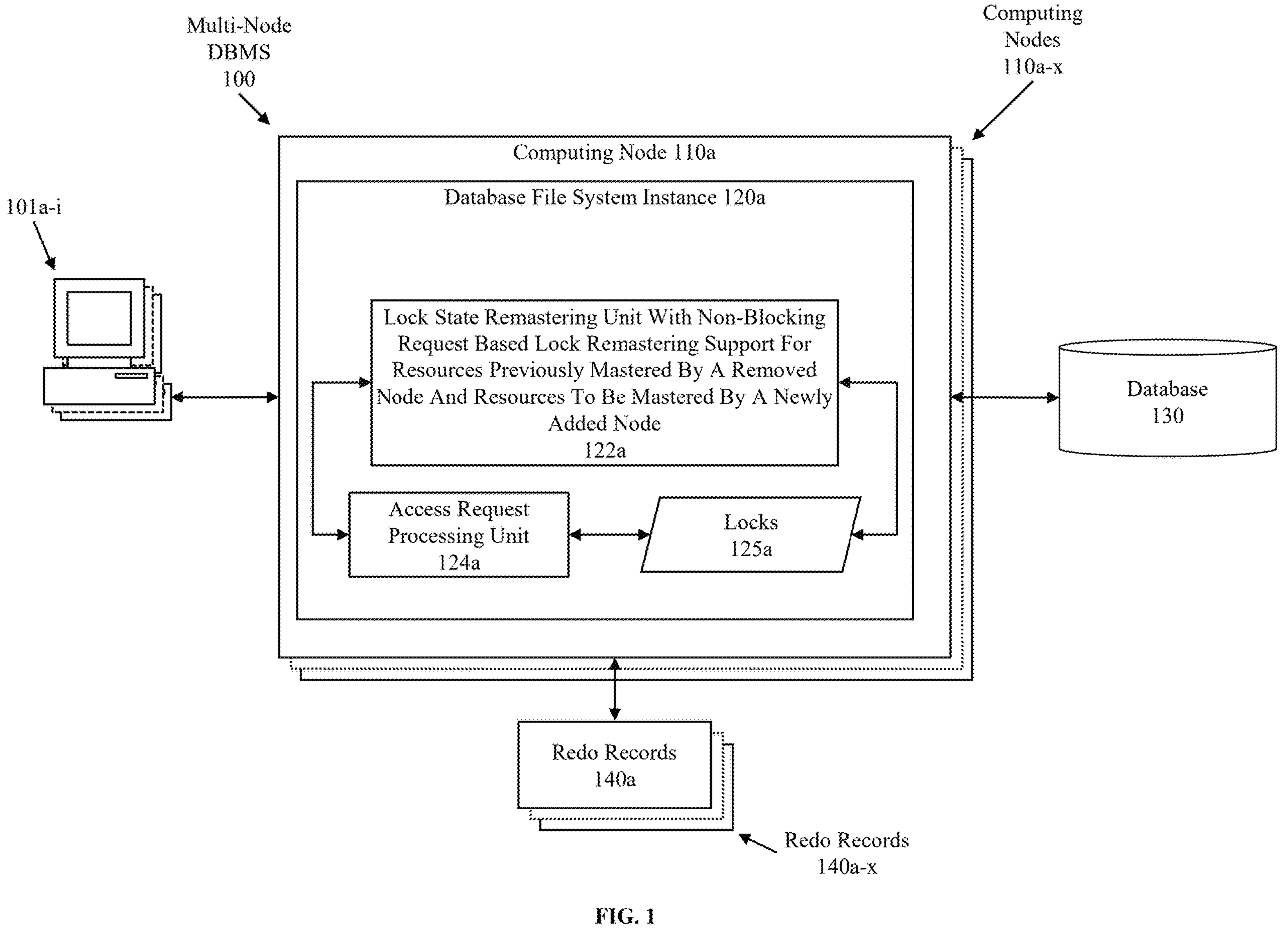
FIG. 1 illustrates an example system in which some embodiments of the disclosure are implemented.

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated. Additionally, any element identified by the same reference number is associated with the same description unless specified herein.

General Overview

As a general matter, there are multiple structures that can be used to maintain lock information in a distributed computing system. Such structures normally execute using a set of rules that relate to access controls (who/what is allowed to do what and potentially when), and compatibility between those controls (e.g., which types of access controls are compatible—e.g., exclusive and non-exclusive controls for read, write, executed, or delete, or the related create, read, update, delete (known by the acronym CRUD)). The locking information is in essence the information used by the traffic controllers (e.g., I/O paths) that enforces data policies to avoid collisions and unauthorized access. This general overview discusses one approach that could be used to provide locking information for a distributed system. Further details of an illustrative approach are described in U.S. Pat. No. 10,296,498 titled "COORDINATED HASH TABLE INDEXES TO FACILITATE REDUCING DATABASE RECONFIGURATION TIME", filed on Aug. 23, 2016, which is hereby incorporated by reference in its entirety. As provided herein there are a number of known lock types. Such lock types can be included herein such as a concurrent read, concurrent write, protected read, protected write, or exclusive lock.

For instance, each lock governs access to resources on a multi-node system and is represented by a lock structure maintained by the multi-node system (e.g., multi-node database management system (DBMS)). Further, each lock structure is used to protect resources being managed by the multi-node system and is assigned a lock master from among the nodes of the system. The lock master, for a particular lock structure, is the node within the system that maintains data in a lock structure that identifies at least all locks on the corresponding resources and their type(s). The multi-node system maintains a master hash table that correlates lock structures with assigned lock masters. In one example, to identify the lock master for a particular resource, the multi-node system uses lock identification information (e.g., a file number and a block number) and a master hash index to identify a bucket that includes information of the lock master corresponding to a particular lock structure for that resource.

The lock master for a particular resource (represented by a lock structure) stores metadata for the resource within one or more local hash tables located on the node. According to some embodiment, the multi-node system stores information, for a particular lock structure within a particular bucket of a local hash table stored on a given lock master node, using a local (hybrid) hash index (which uniquely identifies the particular bucket in the local hash table) that includes the master hash index for that particular lock structure. In this way, the master hash index for a particular lock structure is coordinated with the local hash index for the lock structure.

As such, according to one or more embodiments, a multi-node system uses a hybrid hash index, a portion of which represents a corresponding master hash index, to index into both the master hash table and into a local hash table for a given resource.

According to some embodiments, reconfiguration of lock masters for a cluster of nodes is optimized using coordinated hash indexes. As indicated above, since the locks mapped to a given bucket of the master hash table are stored, on the assigned lock master, relative to the index for the master hash table bucket, only the portions of the local hash table on the lock master that correspond to the index of the master hash table bucket need to be scanned in order to perform the needed tasks for lock state remastering.

In some embodiments, locks may be represented in two places. First, a corresponding master will manage all information relevant for a particular resource—e.g., a list of all current locks and their types along with the node to which they are granted. However, in a multi-node DBFS arrangement it may be inefficient to have only one location that maintains locks for a particular resource. This is because the master of the lock information for a resource may not be, and is often not, the only node in the multi-node DBFS that accesses the resource. Thus, in some embodiments, each node in the multi-node DBFS may also maintain a local entry for each lock that has been granted to that particular node. In this way, when a request is received to access a resource, the corresponding node can check a collection of local entries to determine if the request can be processed using an already granted lock. It is only when the request cannot be processed using an already granted lock that a request must be made to the corresponding master node.

Each entry includes a set of information. Generally, the set of information comprises information about the resource such as resource identification information (e.g., resource name, etc.), links to queues the resource may be on (e.g., grant, convert, cache, etc.), statistics (e.g., a number of current waiters, grant counts, last time referenced, etc.), a basic history trail of activities against the resource for debugging purposes, or some combination thereof. Additionally, each entry when included in a linked list, with the exception of the last entry, includes a link or pointer to the next entry in the list (see 1019*a-n* and 1022*a-n*).

Architecture for Coordinating Hash Indexes for Continuous Database Locking During Database Reconfiguration FIG. 1 illustrates an example system in which some embodiments of the disclosure are implemented. Generally, the system includes one or more computing nodes that are interconnected and that might each include a database file system instance for managing at least the grant and removal of locks on resources that may be shared across different processes as discussed herein. Moreover, the system implements an approach that provides continuous database locking during database reconfiguration that can very quickly put a multi-node DBMS into a condition where it can process lock requests and allow resources to be accessed, even when those resources correspond to locks that require remastering.

The system comprises a multi-node database management system (DBMS) 100 including computing nodes 110*a-x* which present an underlying database 130, or subsets thereof, to computer devices 101*a-i* coupled to the multi-node DBMS. Each computing node (see 110*a-x*) manages access to data or resources using at least a lock management approach. The data and resources can comprise any combination of data (e.g., data in an object or relational database or consolidated database instances) or any other resources that may be accessible to one or more processes. The database 130 may comprise any type of database, such as a consolidated database that is accessed via a plurality of pluggable-databases.

In some embodiments, the computing devices 101*a-i* interact with any of the computing nodes (see e.g., 110*a-x*). For instance, a computing device might be used to connect to and access data managed by the cluster via one of the computing nodes. Furthermore, the computing devices might be controlled by a user, another service, an administrator, or comprise any other computing device that allows data access to the computing nodes or an element therein.

The computing devices 101*a-i* comprise any type or combination of computing devices that may be used to operate or interface with a computing node, whether directly or indirectly. Examples of such user computing devices include workstations, personal computers, laptop computers, or remote computing terminals. User computing devices 101*a-i* may also comprise any type of portable tablet device, including for example, tablet computers, and portable readers. User computing device 101*a-i* may also include mobile telephone devices relating to any mobile device that can suitably access any computing systems on the Internet such as smartphones and programmable mobile handsets. It is noted that the disclosure is not limited in its application to just these types of devices. The embodiments of the disclosure are applicable to any computing device that works in conjunction with access to digital information stored on, as an example, the Internet. One of ordinary skill in the art may appreciate that embodiments of this present disclosure may be implemented on the Internet, on a closed network, on a hybrid open or closed network, or on a cloud network.

In some embodiments, the computing devices 101*a-i* and the computing nodes 110*a-x* are interconnected to each other over a network. The network might comprise a local area network, a wide area network, a connection over the internet, a dedicated backhaul, or any combination thereof. Additionally, each computing node (see 110*a-x*) might be able to communicate over the network e.g., to other computing nodes.

In some embodiments, each computing node (see e.g., 110*a-x*) includes one or more processes (see e.g., 122*a* and 124*a*) that interact with the computing node to access resources of the database. Such processes may be used to execute any task as is appropriate, such as user or frontend processes and administrative or backend processes. Such access may require one or more locks—e.g., locks on resources to be created, read, updated, or deleted.

In some embodiments, each computing node (see e.g., 110*a-x*) includes a database file system instance (see e.g., 120*a*) which itself includes a collection of lock information (see e.g., 125*a*), an access request processing unit (see e.g., 124*a*), and a lock state remastering unit (see e.g., 122*a*). Furthermore, the lock state remastering unit includes non-blocking request-based lock remastering support for resources previously mastered by a removed node (e.g., a computing node that failed or was otherwise removed from the multi-node DBMS) and resources to be mastered by a newly added node (e.g., a computing node that has been added to the multi-node DBMS for at least providing lock mastering).

Generally, locks are maintained in any form that is known in a lock management structure (see e.g., locks 125*a*). For instance, as discussed herein, a hashing algorithm is used to determine which computing node of the computing nodes 110*a-x* in the multi-node DBMS 100 is to be the master for a resource. For instance, the hashing algorithm might be applied to resource identification information (e.g., file number and block number) to determine which computing node is that resources master (e.g., either directly or in a data structure that maps the hashing result to an assigned computing node).

An access request processing unit (see e.g., 124*a*) generally performs operations to determine whether a request is allowed to be executed. For example, upon receipt of a request to access a resource (e.g., from a computing device), the access request processing unit will first access the corresponding lock information that is local to the unit (e.g., access request processing unit 124*a* access locks 125*a*) to determine whether there is currently a lock that grants the necessary access rights to complete the request. If there is a lock that grants the necessary access rights, the access request processing unit will execute the request by performing the requested access. However, if there is no such lock the access request processing unit will send a corresponding request to acquire the necessary lock(s) to complete the request. As a general matter, when no remastering processes are currently active, normal request flows would be followed which generally comprise requesting a master (even if it is the same computing node) to grant the request lock(s) and waiting for a response before processing the request—or potentially denying or delaying the request as may be required. However, in the context of the present embodiment, the approach leverages a lock state remastering unit (see e.g., 122*a*) which may or may not be part of the regular lock management arrangement.

The lock state remastering unit (see e.g., 122*a*) may be included in or separate from the normal lock mastership processes. Generally, the lock state remastering unit is provided to address changes to the lock mastership. For instance, when a computing node leaves the multi-node DBMS, for whatever reason, any locks that were previously managed by that node need to be distributed to one or more computing nodes that remain in the multi-node DBMS. Likewise, when a computing node is added to the multi-node DBMS it is preferable to distribute some of the workload that was previously held by one or more other computing nodes. Thus, the lock state remastering unit can use used to control the processes to remaster locks in the multi-node DBMS. However, remastering locks takes time. During which, without more, the resources of the database 130 are not accessible. As will be discussed further, the present approach provides for not only a lock state remastering unit, but a lock state remastering unit with non-blocking request-based lock remastering support for resources previously mastered by a removed node and resources to be mastered by a newly added node.

In some embodiments, the multi-node DBMS includes one or more redo records 140*a-x*. For instance, each computing node in the DBMS might be associated with a set of redo records. Such records maybe reproduced at 140*a-x* in a form that is accessible to computing nodes in the DBMS even in the event of a failure of a corresponding computing node—e.g., in an online redo records repository. Such records may comprise a log of operations that modified a managed resource and corresponding information for determining their respective timing and sequencing. In the event of a failure of a computing node in the multi-node DBMS the remaining nodes may access and process the redo records to bring any resources managed by the failed computing node to a most recent state.

In some embodiments, the data comprises any combination of data (e.g., a such as data in an object or relational database or consolidated database instances) or any other resources that may be accessible to one or more processes.

Figure 2:
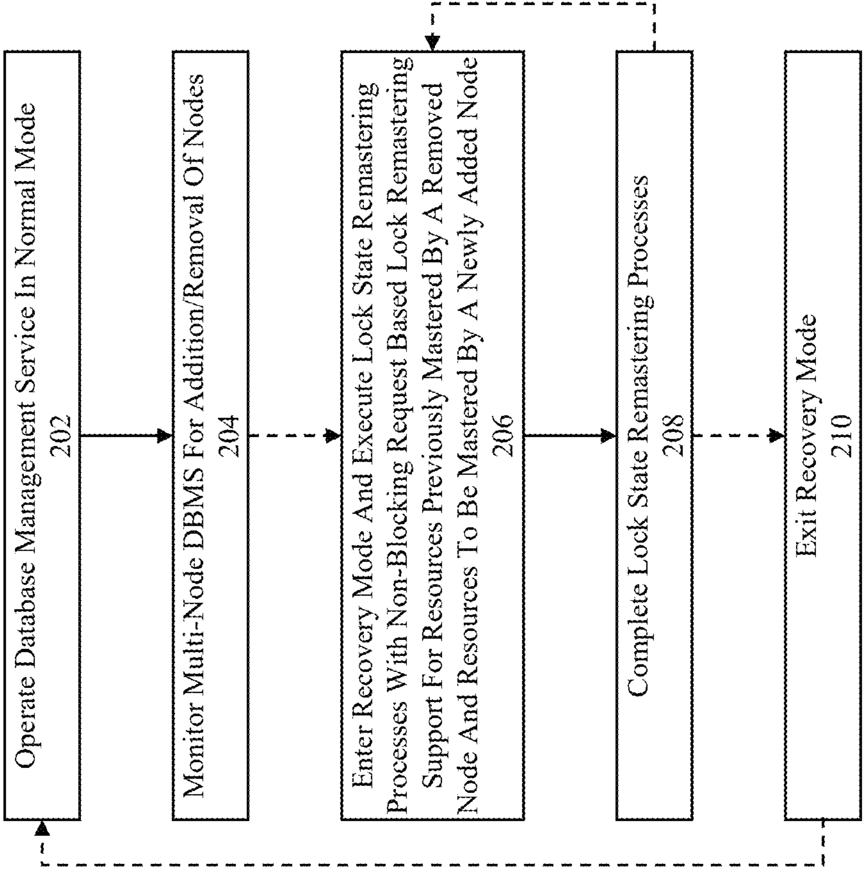
FIG. 2 is a flowchart for continuous database locking during database reconfiguration according to some embodiments.

FIG. 2 is a flowchart for continuous database locking during database reconfiguration according to some embodiments. From the perspective of the approaches described herein, the multi-node DBMS may operate in two modes. In a normal mode the multi-node DBMS may operate using any known approach to manage locks and to provide requestors access to the underlying data therein (e.g., a shared mastership approach where hashing is used to determine mastership of lock information for respective resources). However, in the event of a change to the membership of computing nodes in the multi-node DBMS (e.g., when a new node is added to the multi-node DBMS or when a node is removed from the multi-node DBMS), the multi-node DBMS may enter a recovery mode to remaster corresponding resources.

In a normal mode the multi-node DBMS generally receives and processes requests without delay. For instance, a request to access a resource might be associated with a corresponding lock. A computing node of the multi-node DBMS receives such a request and processes that request by first determining whether local lock information specifies that the requestor (or process) holds the necessary authorization to perform the request (e.g., whether there is a current lock granted to the process). If such a lock exists the request can be processed without further delay because no conflicting lock exists. However, if there is no such lock, the multi-node DBMS will request a lock that grants sufficient privileges from the master of the resource. Additionally, the computing node may determine the corresponding master, which may or may not be the same node, by applying a hashing algorithm to some or all of resource identification information. Upon receipt of a response from the corresponding master the computing node will take appropriate action—such as updating a local entry to indicate the relevant parameters of the granted or denied lock, executing the request, responding to the request to indicate that it has been granted or denied, and/or executing a corresponding access. For example, a file open request might be received and a corresponding lock might be issued using an exclusive access mode, a read only mode, an exclusive write mode, or any other mode as is known in the art.

As the multi-node DBMS operates, it is monitored at 204 for addition or removal of computing nodes from the cluster. In the event, of an addition or removal a computing node at 204, the process triggers the entry into recovery mode and the execution of a lock state remastering flow at 206. For instance, a corresponding monitoring unit may detect a failure of a computing node in the multi-node DBMS (e.g., due to lack of liveliness signal or failure report) and send information identifying the failure to a lock state remastering unit (see e.g., 122*a*). Likewise, a configuration processing unit or other element may detect a change in the configuration of the multi-node DBMS (e.g., due to the registration of a new computing node with the multi-node DBMS) and send information identifying the addition of the computing node to the multi-node DBMS.

At 206, the recovery mode is entered and the lock state remastering process is executed as will be described herein. Generally, the approach provided includes non-blocking request-based lock remastering support for resources previously mastered by a removed node and resources to be mastered by a newly added node. This enables the multi-node DBMS to allow access to resources that are not being remasters and even to resources that are being remastered. At a high level, this is accomplished using some additional management information and two different types of processing flows for remastering. The first flow performs remastering responsive to the events discussed above in regard to 202 and 204. The second flow performs remastering responsive to the specific requests that are received or pending during the operation of multi-node DBMS in the recovery mode. Additionally, the two flows are managed such they are responsive to actions in the other flow.

In some embodiments, the lock state remastering processes is event based. Specifically, the lock state remastering process is started on an event-by-event basis. For instance, a computing node being added to or removed from the multi-node DBMS at one point in time is considered an event. Such an event, upon detection, is used to trigger the entry into the recovery mode and the execution of the lock state remastering flow. Upon completion of lock state remaster for locks corresponding to that event (see e.g., 208) the flow may mark the corresponding remastering as complete. However, it may happen that before the processing is completed for one event, another event occurs. Thus, once the lock state remastering is complete for a first event, the flow may return to 206 from 208 to process the later occurring event. This may continue until all events have been processed. After which the process will proceed to 210 where the recovery mode is exited and the multi-node DBMS returns to the normal mode.

Figure 3:
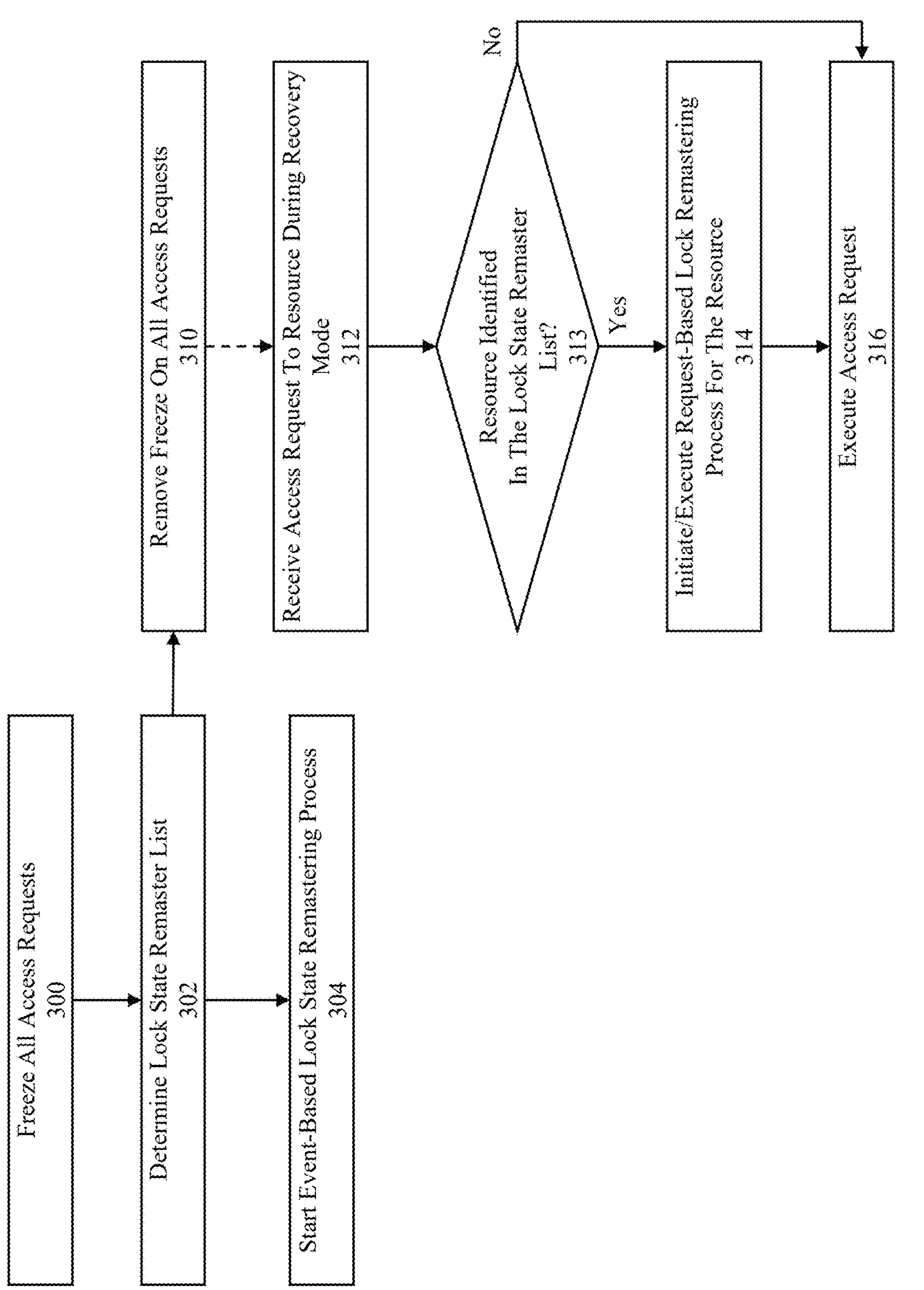
FIG. 3 illustrates a flow for entering a recovery mode and executing a lock state remastering processes according to some embodiments.

FIG. 3 illustrates a flow for entering a recovery mode and executing a lock state remastering processes according to some embodiments. Generally, the approach includes applying a blanket freeze on all access requests, a determination of what locks need remastering, a removal of the blanket freeze on all access requests, starting the event-based lock state remastering process, and processing access requests. Where access requests to resources that are not affected by the event can proceed without further delay and access request to resources that are affected by the event can be processed using a request-based lock state remastering process that can be completed more quickly because it is only for a requested resource.

Generally, the process starts are 300 where a blanket freeze is placed on all access requests in the multi-node DBMS. Applying the blanket freeze stops all requests to the multi-node DBMS to allow for the multi-node DBMS to determine what lock states need remastering which avoids further resource conflicts. Such a blanket freeze might be placed on the multi-node DBMS by setting a flag in a shared storage structure, by broadcasting a message to all computing nodes in the multi-node DBMS, or using any other known approach to quickly set a status value in a multi-node DBMS or cluster.

A lock state remaster list is determined at 302. The lock state remaster list may comprise a data structure, a portion of a data structure (e.g., a portion of the lock information on one or more computing nodes in the multi-node DBMS), or an identification of the corresponding lock(s). For instance, where lock mastership is managed using at least a hashing algorithm, any locks for which the application of the hash results in one or more specified values may be determined to the be in the lock state remaster list. Where the corresponding event is the failure or removal of a computing node from the multi-node DBMS, the determined lock state remaster list may comprise all locks that were, or would have been, mastered by the failed/removed computing node. On the other hand, when the corresponding event is the addition of a new computing node to the multi-node DBMS the determined lock state remaster list may comprise a collection of locks to be remastered at the new computing node or any identification thereof. Since there are multiple computing nodes in the multi-node DBMS, any one of which (or a separate management process) may determine the parameters of the lock state remaster list. For instance, a quorum could be formed, a node could be elected leader of the remaster list determination, or first to complete could be used where the first computing node in the multi-node DBMS that completes the determination controls what is on the remaster list. Regardless, should multiple computing nodes complete the determination, each should be in agreement as each will apply the same approach to make the determination.

Once the lock state remaster list has been determined, the process may proceed to 304 and 310. At 304 the event-base lock state remastering process is started. This will be discussed in further detail below, but generally comprises a cleanup, replay, and fix write state process which is executed on each computing node in the multi-node DBMS. At 310, the blanket freeze applied on all access requests at 300 is removed. This allows for the processing of requests in the multi-node DBMS as will be discussed further below.

After the blanket freeze has been removed at 310, the multi-node DBMS may receive an access request(s) (on any of the computing nodes of the multi-node DBMS) to a resource while the multi-node DBMS is in the recovery mode at 312. Such an access request is processed in one of two manners depending on at least whether the request is to a resource that falls under the lock state remaster list (see e.g., 313). Specifically, if the access request corresponds to a resource that is not in the lock state remaster list (see e.g., 302 and 313) the flow proceeds to 316 where the request is processed in an otherwise normal manner. However, if the request is for a resource identified by the lock state remaster list (see e.g., 302 and 313), the process may proceed to 314 where a request-based lock remastering process is started for the requested resource. The request-based lock remastering process is discussed further below. If the request-based lock remastering process is completed successfully the process proceeds to 316 where the access request is executed. As one would understand, the multi-node DBMS may receive any number of access requests while in recovery mode, each of which would be processed in a similar manner.

In some embodiments, additional optimizations may be provided to increase the speed in which requests can be handled. For instance, at 313 one or more bloom filters might be used to quickly determine whether a corresponding resource requires redo recovery. As is known, a bloom filter maps multiple values to a single value. Generally, that single value may provide a false positive but will not provide a false negative. Thus, if a corresponding condition is true for any one of the multiple values it will be identified as true in the bloom filter. However, since it may be a false positive further processing would be required to determine whether the condition is actually true for the particular value. In contrast, a bloom filter does not provide a false negative. Thus, a bloom filter can quickly be used to determine whether a requested resource does not require lock state recovery. As provided herein, a bloom filter can be generated for each event, and each bloom filter can be processed to determine the correct outcome while the event is still being processed in the event-based lock state remastering process and thereafter during redo record processing. Thus, a bloom filter could be generated for the recovery set(s) described below at least in regard to 430, 432, and 434 to quickly determine whether redo records will be required to be processed before a corresponding request can be processed. Both of which may be utilized at 313 to improve the efficiency of the approach. Further details of an illustrative approach are described in U.S. Pat. No. 10,809,916 titled "INSTANCE RECOVERY USING BLOOM FILTERS", filed on Apr. 17, 2017, which is hereby incorporated by reference in its entirety.

Figure 4:
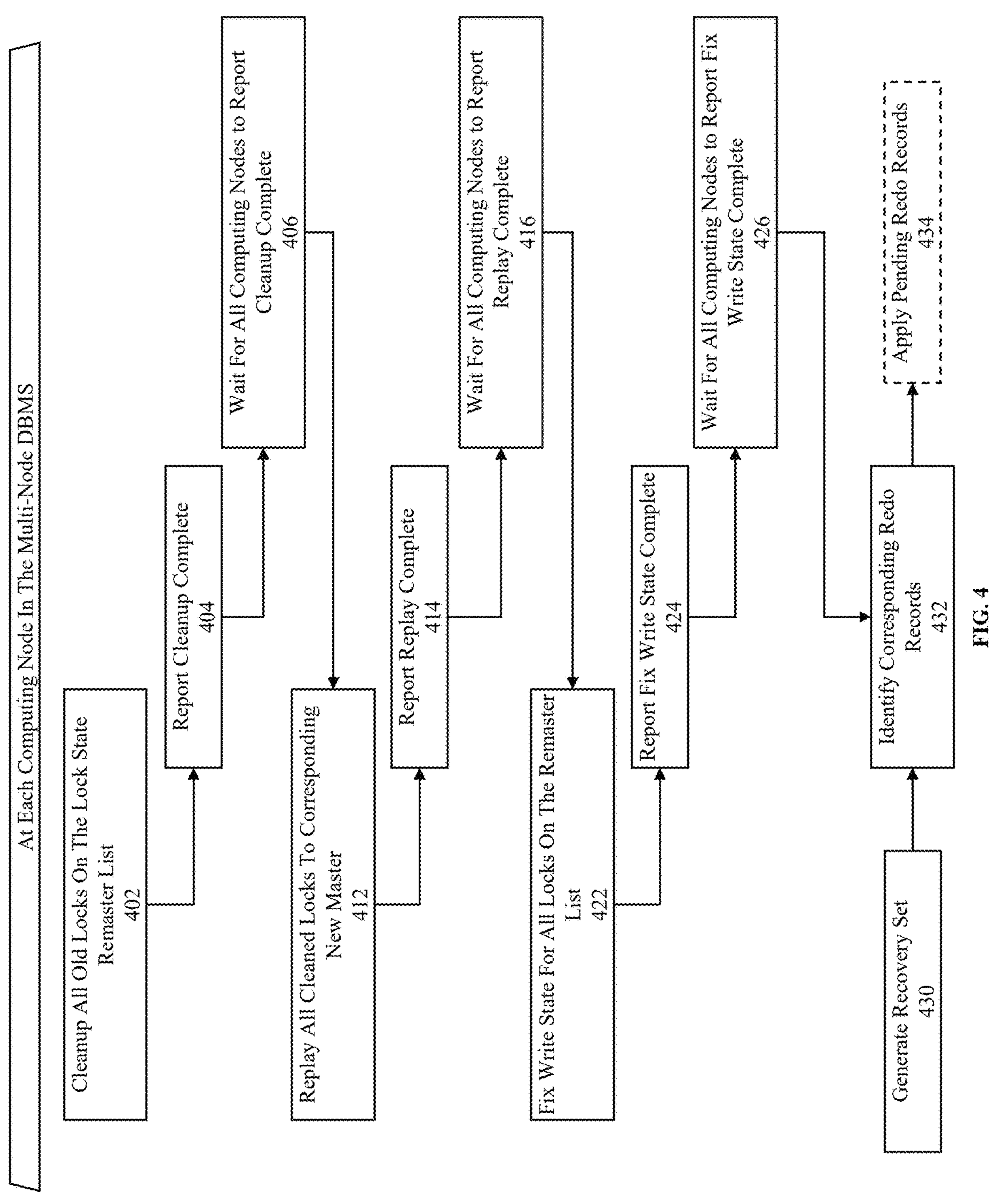
FIG. 4 illustrates a flow for event-based lock state remastering according to some embodiments.

FIG. 4 illustrates a flow for event-based lock state remastering according to some embodiments. Generally, event-based lock state remastering is executed in a phased manner where each computing node in the multi-node DBMS performs the necessary processing and reporting before the next phased (e.g., each node performs cleanup operations in a cleanup phase, replay operations in a replay phase, and fix write state operations in a fix write state phase). Similarly, each computing node in the multi-node DBMS waits for the other computing nodes in the multi-node DBMS to complete each phase before moving to the next phase. After the cleanup, replay, and fix write operations are completed redo records can be applied as appropriate and any conflicts can be addressed.

At 402, each computing node cleans up old locks on the lock state remaster list. Generally, a clean-up step is required at least when reconfiguration is precipitated by a change in the master computing node for that particular resource. At a general level, cleanup operations are known and normally comprise cancelling or rejecting any pending lock requests. As provided herein, the lock state remaster list can be used to limit the necessary cleanup operations to operations for resources that are on the lock state remaster list as the remaining locks should not be affected by the remastering process. For instance, each computing node will cancel any lock requests that it has pending (e.g., regardless of whether the computing node is the master of that resource). While pending requests are cancelled, those requests can be reissued to the corresponding new master of the resource at a later time. Once the cleanup operations have been completed for all resources on the lock state remaster list a reporting operation is executed at 404. Such reporting may be accomplished using any appropriate mechanism such as by updating a value in a shared tracking data structure, sending a message to a node that is the leader of the remastering process, or broadcasting a message to all computing nodes in the cluster (or at least those that participate in the lock state mastership processes). Once the cleanup operation completion has been reported by a computing node, it will wait for all other computing nodes in the multi-node DBMS to provide a similar report of completion (see e.g. 406).

After the cleanup operations have been completed a lock replay process is executed. Generally, a replay step is required when there is an existing lock that has a mastership change. For instance, in a multi-node DBMS, each computing node maintains two different types of lock information. The first is the lock information for the resources for which that node is the master. Such information includes at least all locks that are currently held on a respective resource by any computing nodes in the multi-node DBMS, regardless of whether the lock is, or is not, issued to the master of that resource. Likewise, each computing node in the multi-node DBMS that holds a lock on a resource of the multi-node DBMS will include an entry for that respective resource that identifies the resource and lock and any relevant parameters (e.g., the lock type, the expiration time, etc.). Thus, logically speaking, for any lock on a resource there is at least one and potentially two corresponding entries—a first at the master and potentially a second at the non-master lock holder. In the event that a master of any particular resource fails, any locks held by the non-master need to be accounted for. This is done by replaying the locks from each computing node in the multi-node DBMS that remains to the corresponding new master. Thus, in order to perform replay of a lock on the lock state remaster list, each computing node may send a replay message or a lock request message to the new master for any corresponding locks. This is done by all computing nodes in the multi-node DBMS (in some embodiments, even when the replay is to itself). Likewise, those replay messages or lock request messages are processed by each corresponding computing node in the cluster to the extent that the corresponding computing node is the new master of a resource corresponding to the lock state remaster list. Once the replay operations have been completed for all resources on the lock state remaster list a reporting operation is executed at 414. Such reporting may be accomplished using any appropriate mechanism such as by updating a value in a shared tracking data structure, sending a message to a node that is the leader of the remastering process, or broadcasting a message to all computing nodes in the cluster. Once the replay operation completion has been reported by a computing node, it will wait for all other computing nodes in the multi-node DBMS to provide a similar report of completion (see e.g. 416).

Having completed the cleanup and replay operations, the write state for each lock on the lock state remaster list may need to be fixed. Generally, this step is intended to correct issues that may arise due to write operations on respective resources that were started but were not completed. Specifically, when a computing node that is the master of a resource is removed from the multi-node DBMS (e.g., due to failure of that computing node), it is possible that there may be one or more in progress write operations on respective resources that have not completed. The fix write state process attempts to correct the state of the locked resource by completing any pending writes. For example, to be written data is stored in a buffer (e.g., write ahead log) prior to writing that data to the corresponding resource. That buffer can be accessed after a failure of a computing node to complete the write operation. In one approach, when a write operation is initiated, a header or other value in or associated with the data being written to disk is marked to specify that the write operation has been initiated. When the write operation is completed, the marking is removed to specify that the write operation is completed. As such, a header or other value in or associated with the data can be used as an indication that the corresponding write operation was initiated and not completed. The fix write state process at each node will analyze any resources corresponding to the lock state remaster list for which it is a master, determine whether the write state needs to be fixed, and will fix the write state as needed by completing the corresponding operation(s). Once the write state has been fixed, for all resources on the lock state remaster list for which the particular computing node is the master, a reporting operation is executed at 424. Such reporting may be accomplished using any appropriate mechanism such as updating a value in a shared tracking data structure, sending a message to a node that is the leader of the remastering process, or broadcasting a message to all computing nodes in the cluster. Once the fix write state operation completion has been reported by a computing node, it will wait for all other computing nodes in the multi-node DBMS to provide a similar report of completion (see e.g. 426).

As provided herein, the approach to execute the cleanup (see 402), replay (see 412), and fix write state (see 422) in the event-based lock state remastering process are executed in awareness of any request-based lock state remastering process. For instance, one or more parameters or fields can be used to track both the event-based lock state remastering process and the request-based lock state remastering process. For the event-based lock state remastering process, each resource is processed in each phase and a corresponding status update is made. For example, the approach to event-based lock state remastering process may mark a resource as currently undergoing processing by the event-based lock state remastering process, indicate the processing that is being executed or has completed (e.g., cleanup, replay, or fix write state), and remove the indication that the resource is currently undergoing processing upon completion of the corresponding operation(s). If a request-based lock state remastering process is started on a resource, the event-based lock state remastering process will no longer attempt to process that resource for (e.g., cleanup, replay, or fix write state). For instance, a request-based lock state remastering process is initiated in response to a request received from a user process. That request is used to trigger (where appropriate) the request-based lock state remastering process. The request-based lock state remastering process determines whether the event-based lock state remastering process is currently operating on the resource (i.e., the requested resource). If the event-based lock state remastering process is currently operating on the resource, the request-based lock state remastering process waits for the event-based lock state remastering process to finish its current processing. When the resource is not, or no longer, being operated on by the event-based lock state remastering process, the request-based lock state remastering process will mark the resource to indicated that it is processing the resource, perform processing (e.g., cleanup, replay, or fix write state) in a manner that is responsive to which, if any, of the cleanup, replay, or fix write state were already completed, and then mark the resource as completed processing. The request-based lock state remastering process is discussed at least in regard to FIG. 5. In some embodiments, after the cleanup, replay, or fix write state processing is completed for all resources, the event-based lock state remastering process triggers redo record processing (see e.g., 432 and 434) to apply pending redo records where indicated by one or more parameters.

In some embodiments, there are multiple levels of redundancy to avoid loss of data. For instance, a first level of redundancy may be provided by storing write operations and the corresponding data in a buffer used for at least fix write state operations. A second level of data redundancy may be provided in redo records that are maintained in one or more locations that can be accessed independently from a failed computing node in the multi-node DBMS. For instance, redo records can be maintained locally (as in on a respective computing node) and online (as in remotely from the computing node and accessible over a network). In the event of a failure of a computing node in the multi-node DBMS, the redo records (e.g., the online redo records) may be processed to bring the multi-node DBMS up to a given target time (e.g., most recent). Such processing is provided in regard to 430, 432, and 434. In some embodiments, redo records for multiple computing nodes of the multi-node DBMS are processed where a computing node that has or had a lock on a corresponding resource may have generated a redo record which is to be applied to the corresponding resource. In some embodiments, the redo record processing operations (see 430, 432, and 434) are separate from the lock state remastering process, and may block a corresponding access to a resource that was previously on a lock state remaster list. This is because the redo records must be processed before applying further changes to the resource, or acting on an incorrect state of a resource—e.g., to avoid corrupted or otherwise incorrect values.

Specifically, at 430, a recovery set comprising an identification of locks in the lock state remaster list that correspond to redo records in a relevant time frame may be identified. The relevant time frame may comprise the time since a last known write that was completed by a computing node that was removed from the multi-node DBMS or from a last identified liveliness indicator (e.g., a heart beat signal). Likewise, the time frame may run to a specific time or to a latest time. In some embodiments, a sequencing number is used to determine the relevant redo records. In some embodiments, the process of 430 may be initiated just after the lock state remaster list is determined (see e.g., 302)—and likely generated before the completion of the cleanup, replay, and fix write state processing of the event-based lock state remastering process. In some embodiments, the recovery set is generated by a single computing node in the multi-node DBMS (e.g., the same computing node that generated the lock state remaster list).

After the recovery set is generated at 430 and the computing nodes in the multi-node DBMS have reported completion of the fix write state operations at 426, the approach may identify the corresponding redo records at 432. Such a process may be performed by each computing node that is a master of a lock on the lock state remaster list. For instance, each computing node processes redo records to identify redo records to be applied to a resource in the lock state remaster list, regardless of whether the computing node is now the master of that resource. Upon the identification of a corresponding redo record, each computing node at 434 applies the pending redo record to the locked resource. In this way, the approach can bring the newly remastered resource to the most current state that is known. In some embodiments, redo records may be generated and recovery may be required for any number of reasons generally associated with a failure of some form—which may even include the temporary failure of a node without remastering (e.g., the death and recovery of an instance owning a set of locks).

In some embodiments, one or more lock-related inconsistencies may remain after lock state remastering. Approaches to address lock-related inconsistencies are described in U.S. Pat. No. 7,315,910 titled "TECHNIQUES FOR HANDLING LOCK-RELATED INCONSISTENCIES", filed on Jun. 16, 2005, which is hereby incorporated by reference in its entirety. Further details on approaches to address lock-related inconsistencies, including relevant structure associated therewith, are described in U.S. Pat. No. 7,200,623 titled "METHODS TO PERFORM DISK WRITES IN A DISTRIBUTED SHARED DISK SYSTEM NEEDING CONSISTENCY ACROSS FAILURES", filed on Mar. 4, 2002, which is hereby incorporated by reference in its entirety.

Further details are provided below at least in regard to FIGS. 5-6 for the event-based remastering according to some embodiments.

Figure 5:
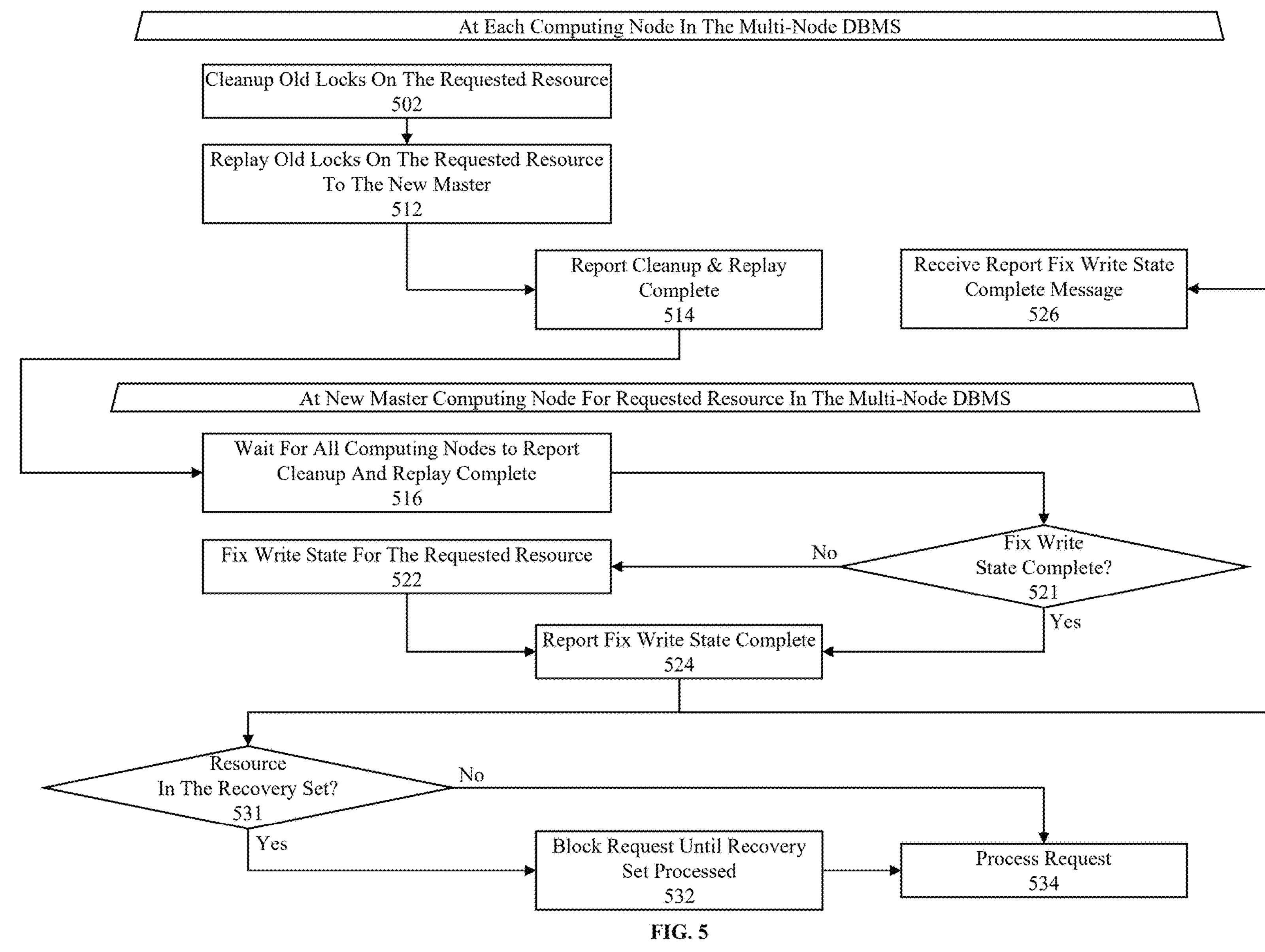
FIG. 5 illustrates a flow for request-based lock state remastering according to some embodiments.

FIG. 5 illustrates a flow for request-based lock state remastering according to some embodiments. Generally, request-based lock state remastering is a modified version of the event-based lock state remastering process. Specifically, the request-based lock state remastering process operates on a particular requested resource. As a result, the operations can be completed relatively quickly and often far quicker then could be accomplished with only the event-based remastering process. Furthermore, the event-based and request-based lock state remastering processes can be executed in parallel as provided herein.

A request-based lock remastering process is started at 314 when the corresponding conditions are met. A request-based lock remastering process may be started in response to forwarding or receiving a corresponding request to the new master of a resources that is on the lock state remaster list—e.g., in response to receipt at the new master of a lock request for a resource on the lock state remaster list.

The elements of the process illustrated at 502, 512, 514, and 526 are completed by each computing node in the multi-node DBMS. In contrast, the elements of the process illustrated at 516, 521, 522, 524, 531, 532, and 534 are only completed by the computing node that is the master of the requested resource.

At 502, cleanup of any locks on the requested resource is completed. These operations are essentially the same as those of 402. However, such operations are not duplicated. As will be discussed further at least in regard to FIG. 6 below, such operations are completed subject to a determinization as to whether cleanup has already been completed for the resource and to various controls as discussed herein—e.g., based on one or more parameters or values that can be used to determine whether cleanup already occurred for the requested resource. However, as a general matter, the approach will be executed on each computing node of the multi-node DBMS to determine whether cleanup has already been completed. If cleanup has already been completed the process proceeds to 512 without delay. Otherwise, a cleanup process is executed at discussed elsewhere herein, but only for the requested resource.

Similarly, at 512, each computing node in the multi-node DBMS will determine whether replay has already been completed for the resource—e.g., based on one or more parameters or values that can be used to determine whether replay already occurred for the requested resource. If replay has already been completed for the resource, the flow will proceed to 514 where it is reported that the cleanup and replay operations have been completed. If the replay has not already been completed, a replay process is executed as discussed elsewhere herein, but only for the requested resource. Once the cleanup and replay operations have been completed, are determined to have already been completed (or some combination thereof) for the requested resource, a reporting operation is executed at 514. Such reporting may be accomplished using any appropriate mechanism such as updating a value in a shared tracking data structure, sending a message to a node that is the leader of the request-based lock state remastering process, or broadcasting a message to all computing nodes in the multi-node DBMS. Once the cleanup and replay operations completion has been reported by each computing node, the master of the requested resource will determine the next action.

At 516, the computing node that is the master of the requested resource will wait for all computing nodes in the multi-node DBMS to report that cleanup and replay are complete. Once the reports are all received the process proceeds to 521 where it is determined whether the fix write state process has already been performed for the requested resource—e.g., whether due to an event-based lock state remastering process or a previously executed request-based lock state remastering process. If the fix write state process has not been completed for the requested resource, the process proceeds to 522, where it is complete as previously provided herein, but only for the requested resource. After a determination that the fix write state has already been completed or the execution of the fix write state by the request-based lock state remastering process, the corresponding reporting for fix write state complete is executed at 524 as provided herein, but again only for the requested resource. Such a report would be received by each computing node in the multi-node DBMS at 526 (see 426 for corresponding description). In some embodiments, in response to the report that the fix write state process has been completed for the resource, each node will update the status of the resource (e.g., mark its status as complete in place of a prior frozen status).

At 531, it is determined whether the request resource is in the recovery set. If the resource is in the recovery set, the request will have to be delayed because the fix write state operations are not sufficient to bring the resource to a current state. Thus, at 532, the request may be blocked (or delayed) until the recovery set has been processed. Such processing is beyond the scope of the disclosure provided herein. However, once the recovery set has been processed or it is determined that the resource is not in the recovery set, the request can then be processed normally at 534. In some embodiments, a bloom filter is provided for each event-based remastering process that represents the recovery set. Specifically, a bloom filter is provided so that the bloom filter can be used to quickly determine whether the requested resource is not included in the corresponding recovery set. If the request is not included in the recovery set it may be processed without delay. In contrast, the bloom filter may indicate that the requested resource could be in the recovery set—e.g., the bloom filter may provide a false positive result. Thus, any positive result found using a bloom filter is confirmed before determining affirmatively whether the request can be processed without delay.

Figure 6:
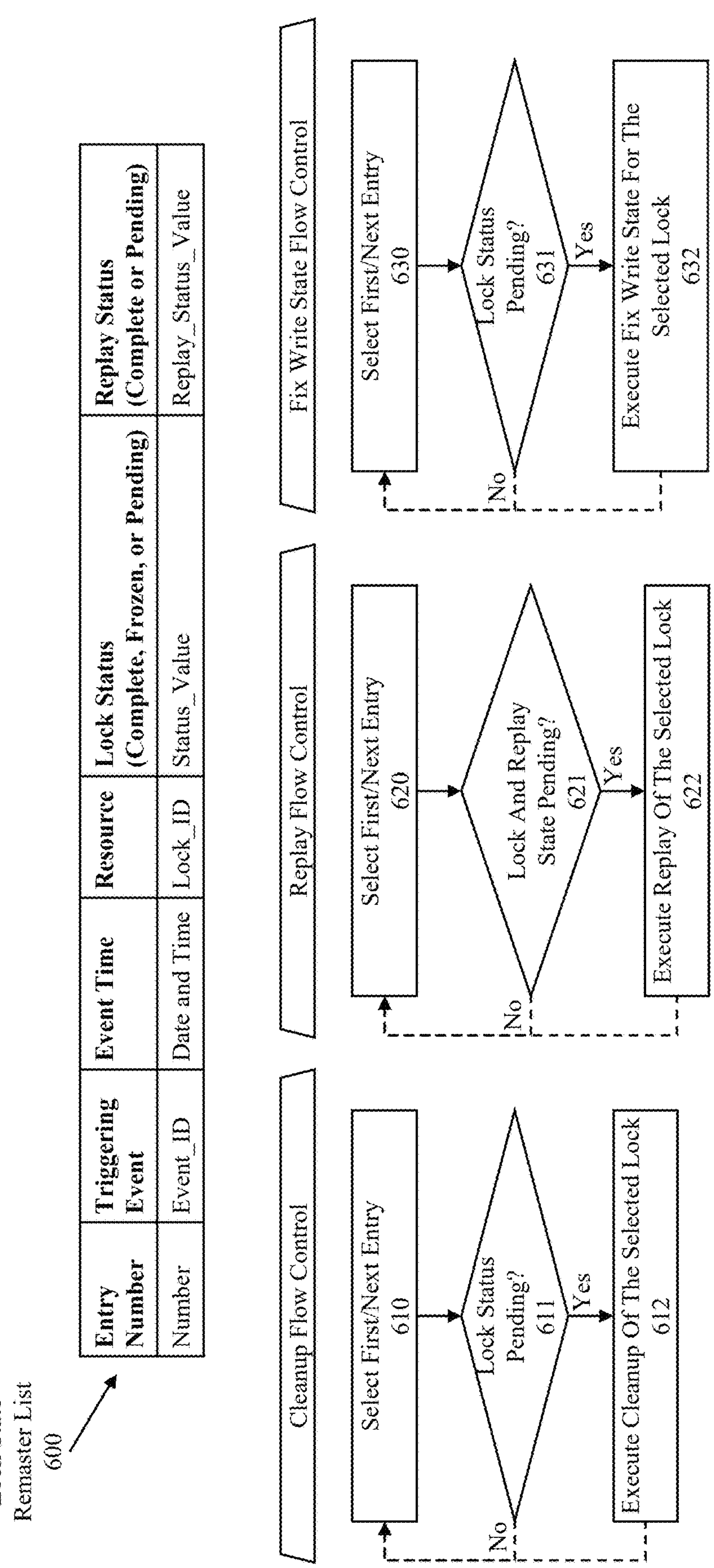
FIG. 6 illustrates an approach to flow control to avoid conflicts between the event-based and request-based lock state remastering processes according to some embodiments.

FIG. 6 illustrates an approach to flow control to avoid conflicts between the event-based and request-based lock state remastering processes according to some embodiments. Generally, the approach provided herein uses various parameters in one or more entries (e.g., in a relational database table) to track both event-based lock state remastering and request based lock state remastering. In some embodiments, each computing node in the multi-node DBMS maintains its own set of entries for managing the lock state remastering processes. Such an approach enables the event-based lock state remastering flow and the request-based lock state remastering flow to execute at the same time while being aware and responsive to changes made by the other.

In some embodiment, the remastering list 600 comprises multiple rows in a relational database table where each row corresponds to a particular event and resource. For example, each row may comprise a number of fields including a respective value for an entry number (Number), triggering event (Event_ID), event time (e.g., date and time), resource (identified by a Lock_ID), lock status (complete, frozen, or pending), replay status (Complete or Pending), or any combination thereof. In some embodiments, some or all of the corresponding information may be maintained in the respective lock information entries. In some embodiments, each computing node in the multi-node DBMS generates a tracking data structure having some or all of the relevant information. These values can be used to control the flow of operations in both the event-based lock state remastering process and the request-based lock state remastering process.

For example, in the event-based lock state remastering flow, cleanup flow control can be used to manage the selection of resources to be cleaned up in 402. As illustrated, at 610, a first or next entry is selected—e.g., a first or next entry in the lock state remaster list. Such a resource may be selected based on a lock ID or entry number or some combination thereof. That entry is then evaluated at 611 to determine the current lock status. If another process (e.g., a request-based lock remastering process) is already processing the resource, the current status should reflect that to avoid a conflict between the request-based lock remastering process and the event-based lock remastering process. Thus, in some embodiments, when the request-based lock remastering process starts on a particular resource, it marks the lock status for the corresponding resource as "frozen". In turn, when or if the event-based lock remastering process attempts to process that request, it would determine that the lock is frozen and would skip that entry (see e.g., no path from 611). Likewise, if a request-based lock remastering process has already completed cleanup, replay, and fix write state operations the lock status may be marked complete and will also be skipped by the event-based lock state remastering process. In the alternative, if the lock status is not marked as frozen or complete (e.g., is marked as pending) the process will execute cleanup of the selected lock at 612 as discussed herein.

Again, in the event-based lock state remastering flow, replay flow control can be used to manage the selection of locks to be replayed in 412. The approach is essentially the same for 610 and 620, and 611 and 621. However, in some embodiments, the determination as to whether to perform replay of the selected resource may depend on both the lock status and the replay status being pending, where only if both states are pending will the replay of the selected lock occur (see yes path of 621 and 622).

Finally, in the event-based lock state remastering flow, fix write state flow control can be used to manage the selection of locks to be replayed in 422. The approach is essentially the same for 610, 620, and 630. Additionally, 611 and 631 perform the same comparison. As a result, only if the lock status is pending (or at least not frozen or complete) will the fix write state process be performed on the selected lock (see yes path of 631 and 632).

In some embodiments, different status values or fields are used to indicate the status of a resource with regard to any lock state remastering processes. For example, a first value could be used to indicate which process, if any, is currently processing a resource. For instance, when an event-based lock state remastering process begins a particular processing action (e.g., cleanup, replay, or fix write state) on the resource, the event-based lock state remastering process marks the resource to indicate that is us undergoing processing by the event-based lock state remastering process (e.g., IP_Event_Processing). Likewise, when the event-based lock state remastering process finishes the current processing action (e.g., cleanup, replay, or fix write state) on the resource, the event-based lock state remastering process marks the resource to indicate that it is pending (if the processing was cleanup or replay) or complete (if the processing was fix write state). Likewise, the event-based lock state remastering process marks a second value to indicate the last operation that was completed (e.g., cleanup, replay, or fix write state). If or when a request-based lock state remastering process is started for a respective resource on the lock state remaster list, the process may first check the first value to determine whether the event-based lock remastering process is currently performing any of the previously indicated processing actions (e.g., cleanup, replay, or fix write state). In the event that this determination is in the affirmative the request-based lock state remastering process waits for the event-based lock state remastering process to complete the particular action. After which, if the last completed state is not fix write state, the request-based lock state remastering process marks the first value to indicate that the request-based lock state remastering process is operating on the resource (e.g., marks the first value as frozen). After which the request-based lock state remastering process will perform any remaining processes (e.g., replay or fix write state).

System Architecture

Figure 7:
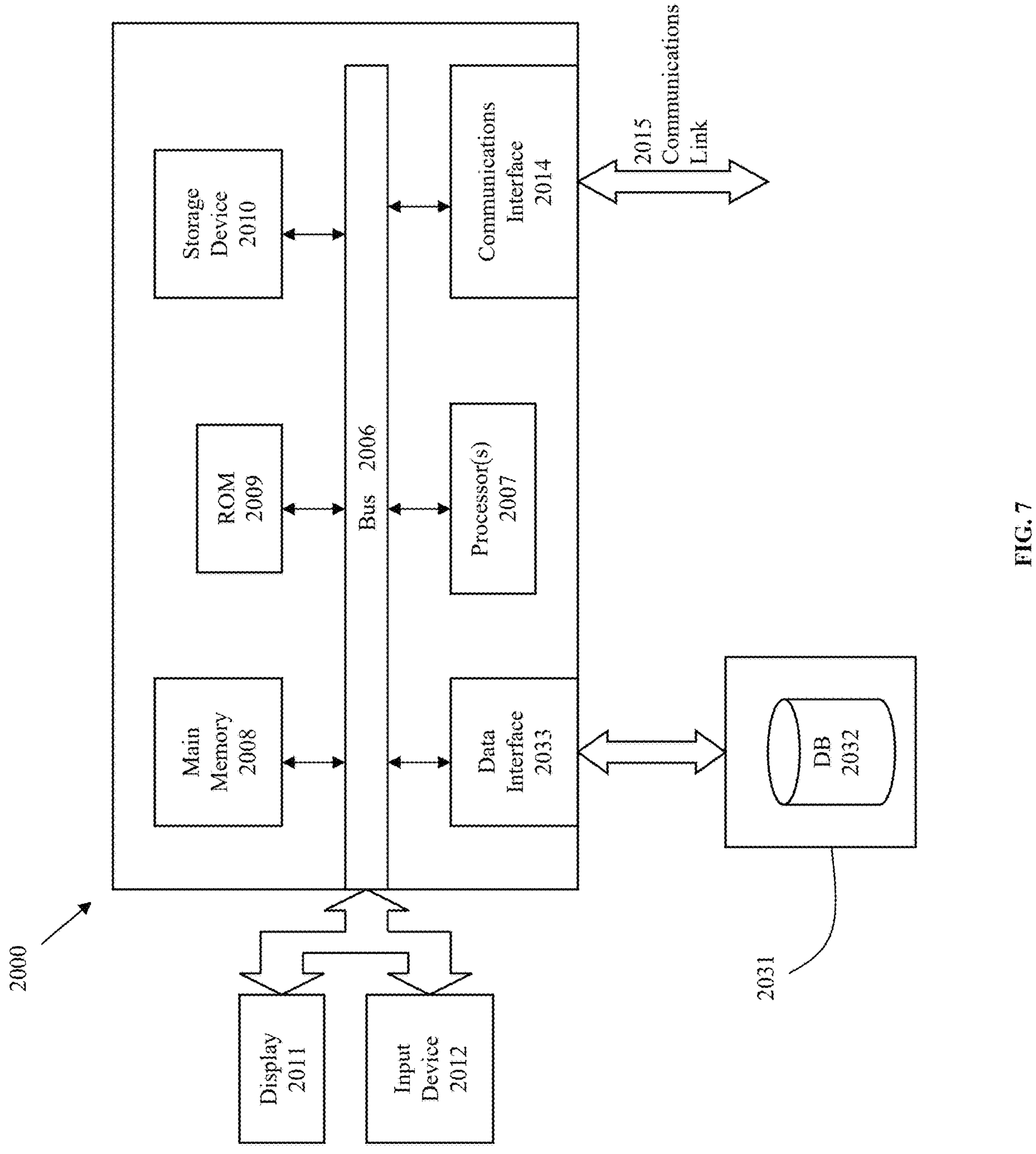
FIG. 7 is a block diagram of an illustrative computing system suitable for implementing an embodiment of the present invention.

FIG. 7 is a block diagram of an illustrative computing system 2000 suitable for implementing an embodiment of the present invention. Computer system 2000 includes a bus 2006 or other communication mechanism for communicating information, which interconnects subsystems and devices, such as processor 2007, system memory 2008 (e.g., RAM), static storage device 2009 (e.g., ROM), disk drive 2010 (e.g., magnetic or optical), communication interface 2014 (e.g., modem or Ethernet card), display 2011 (e.g., CRT or LCD), input device 2012 (e.g., keyboard), and cursor control.

According to one embodiment of the invention, computer system 2000 performs specific operations by processor 2007 executing one or more sequences of one or more instructions contained in system memory 2008. Such instructions may be read into system memory 2008 from another computer readable/usable medium, such as static storage device 2009 or disk drive 2010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2007 for execution. Such a medium may take many forms, including but not limited to, non-volatile media and volatile media. Non-volatile media includes, for example, optical or magnetic disks, such as disk drive 2010. Volatile media includes dynamic memory, such as system memory 2008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 2000. According to other embodiments of the invention, two or more computer systems 2000 coupled by communication link 2015 (e.g., LAN, PTSN, or wireless network) may perform the sequence of instructions required to practice the invention in coordination with one another.

Computer system 2000 may transmit and receive messages, data, and instructions, including program, i.e., application code, through communication link 2015 and communication interface 2014. Received program code may be executed by processor 2007 as it is received, and/or stored in disk drive 2010, or other non-volatile storage for later execution. Data may be accessed from a database 2032 that is maintained in a storage device 2031, which is accessed using data interface 2033.

Figure 8:
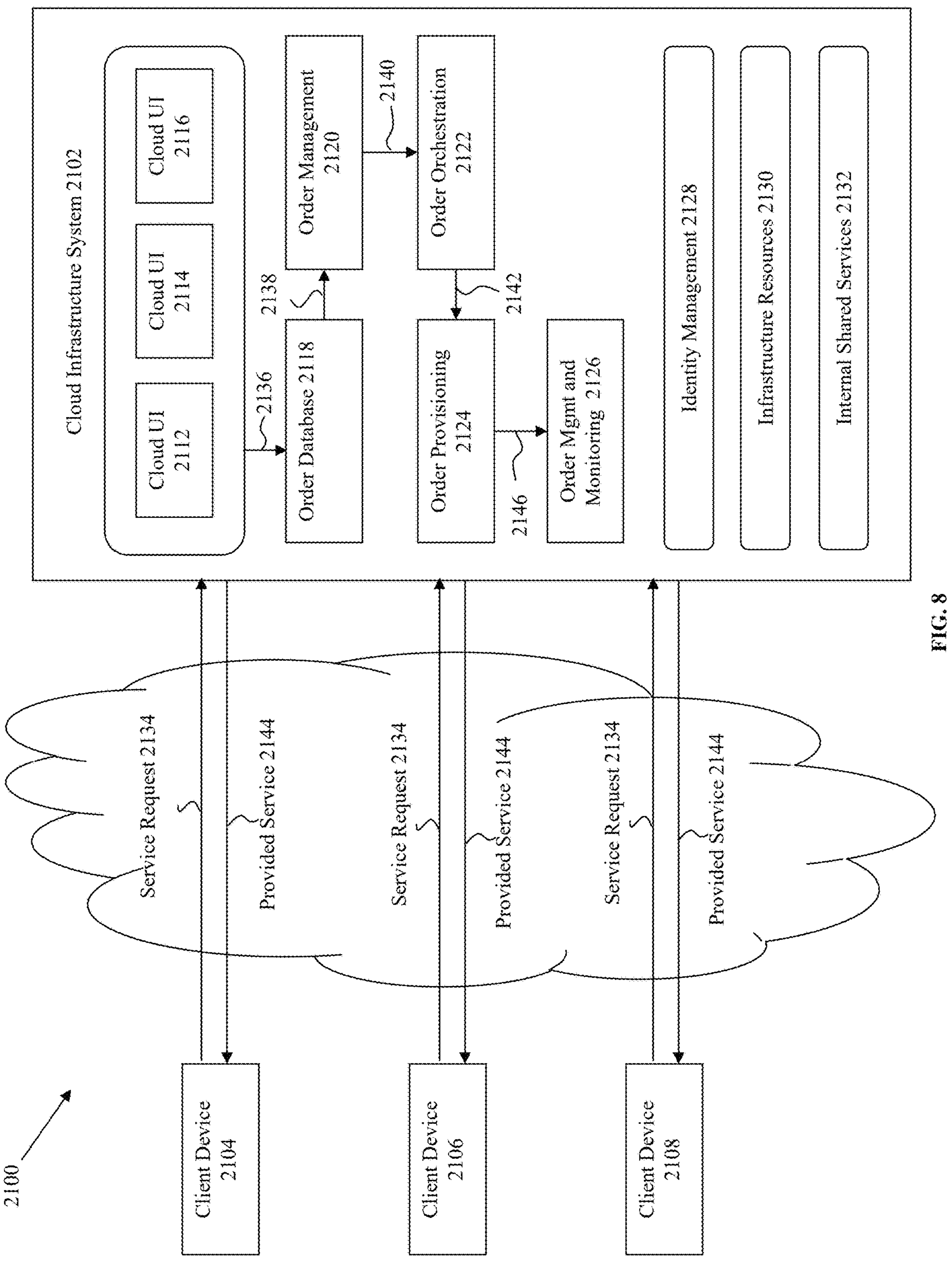
FIG. 8 is a simplified block diagram of one or more components of a system environment by which services provided by one or more components of an embodiment system may be offered as cloud services, in accordance with an embodiment of the present disclosure.

FIG. 8 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application, or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for FIG. 14. Although system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially available protocols. Cloud infrastructure system 2102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116. At operation 2136, the order is stored in order database 2118. Order database 2118 can be one of several databases operated by cloud infrastructure system 2118 and operated in conjunction with other system elements. At operation 2138, the order information is forwarded to an order management module 2120. In some instances, order management module 2120 may be configured to perform billing and accounting functions related to the order, such as verifying the order, and upon verification, booking the order. At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2102 and the physical implementation layer that is used to provision the resources for providing the requested services. Order orchestration module 2122 may thus be isolated from implementation details, such as whether or not services and resources are provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2102 may include an identity management module 2128. Identity management module 2128 may be configured to provide identity services, such as access management and authorization services in cloud infrastructure system 2102. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for continuous database locking during database reconfiguration minimize the amount of time that is needed for lock state remastering for at least some resources that are processed using the disclosed request-based lock state remastering process. Thus, the approaches provided herein are beneficial in that they minimize the amount of time that is needed for database reconfiguration for lock state remastering for at least some resources.

What is claimed is:

1. A computer-implemented method comprising:
- initiating execution of a first lock state remastering process for a plurality of resources by a plurality of computing nodes of a multi-node database management system (DBMS);
- receiving a request to access a particular resource while executing the first lock state remastering process;
- determining that the particular resource is pending lock state remastering; and
- executing, in response to determining that the particular resource is pending lock state remastering, a second lock state remastering process to perform lock state remastering for the particular resource while the first lock state remastering process is executing.

2. The method of claim 1, wherein the first lock state remastering process comprises an event-based lock state remastering process, and a corresponding event comprises an addition of a computing node to the multi-node DBMS or removal of a computing node from the multi-node DBMS.

3. The method of claim 2, wherein the event-based lock state remastering process performs cleanup, replay, and fix write state processing for a plurality of resources of the multi-node DBMS.

4. The method of claim 2, wherein the second lock state remastering process comprises a request-based lock state remastering process, and the request-based lock state remastering process performs cleanup, replay, and fix write state processing only for the particular resource.

5. The method of claim 4, wherein the request-based lock state remastering process marks the particular resource as being in process and the event-based lock state remastering process does not operate on the particular resource after the request-based lock state remastering process marks the particular resource as being in process.

6. The method of claim 1, further comprising determining that the particular resource is on a lock state remaster list and wherein initiating execution of a second lock state remastering process is in response to the determination that the particular resource is on the lock state remaster list.

7. The method of claim 6, wherein the lock state remaster list identifies resources that are to be remastered.

8. The method of claim 1, further comprising processing redo records for one or more resources on a lock state remaster list, wherein the lock state remaster list represents a plurality of resources of the multi-node DBMS and access requests to individual ones of the one or more resources are blocked until processing of respective corresponding redo records has completed.

9. The method of claim 8, further comprising generating a recovery set identifying resources that are associated with at least one redo record, generating a bloom filter for identifying resources that are not in the recovery set, and using the bloom filter to determine whether an access request to a respective resource of the multi-node DBMS can be processed without waiting for processing of the redo records to be completed.

10. A non-transitory computer readable medium having stored thereon a sequence of instructions which, when executed by a processor, cause a set of acts comprising:

initiating execution of a first lock state remastering process for a plurality of resources by a plurality of computing nodes of a multi-node database management system (DBMS);

receiving a request to access a particular resource while executing the first lock state remastering process;

determining that the particular resource is pending lock state remastering; and executing, in response to determining that the particular resource is pending lock state remastering, a second lock state remastering process to perform lock state remastering for the particular resource while the first lock state remastering process is executing.

11. The non-transitory computer readable medium of claim 10, wherein the first lock state remastering process comprises an event-based lock state remastering process, and a corresponding event comprises an addition of a computing node to the multi-node DBMS or removal of a computing node from the multi-node DBMS.

12. The non-transitory computer readable medium of claim 11, wherein the event-based lock state remastering process performs cleanup, replay, and fix write state processing for a plurality of resources of the multi-node DBMS.

13. The non-transitory computer readable medium of claim 11, wherein the second lock state remastering process comprises a request-based lock state remastering process, and the request-based lock state remastering process performs cleanup, replay, and fix write state processing only for the particular resource.

14. The non-transitory computer readable medium of claim 13, wherein the request-based lock state remastering process marks the particular resource as being in process and the event-based lock state remastering process does not operate on the particular resource after the request-based lock state remastering process marks the particular resource as being in process.

15. The non-transitory computer readable medium of claim 10, wherein the set of acts further comprise determining that the particular resource is on a lock state remaster list and wherein initiating execution of a second lock state remastering process is in response to the determination that the particular resource is on the lock state remaster list.

16. The non-transitory computer readable medium of claim 15, wherein the lock state remaster list identifies resources that are to be remastered.

17. The non-transitory computer readable medium of claim 10, wherein the set of acts further comprise processing redo records for one or more resources on a lock state remaster list, wherein the lock state remaster list represents a plurality of resources of the multi-node DBMS and access requests to individual ones of the one or more resources are blocked until processing of respective corresponding redo records has completed.

18. The non-transitory computer readable medium of claim 17, wherein the set of acts further comprise generating a recovery set identifying resources that are associated with at least one redo record, generating a bloom filter for identifying resources that are not in the recovery set, and using the bloom filter to determine whether an access request to a respective resource of the multi-node DBMS can be processed without waiting for processing of the redo records to be completed.

19. A computing system comprising:

a memory to hold a set of instructions;

a computer processor to execute the set of instructions, which when executed, cause a set of acts comprising:

initiating execution of a first lock state remastering process for a plurality of resources by a plurality of computing nodes of a multi-node database management system (DBMS);

receiving a request to access a particular resource while executing the first lock state remastering process;

determining that the particular resource is pending lock state remastering; and executing, in response to determining that the particular resource is pending lock state remastering, a second lock state remastering process to perform lock state remastering for the particular resource while the first lock state remastering process is executing.

20. The computing system of claim 19, wherein the first lock state remastering process comprises an event-based lock state remastering process, and a corresponding event comprises an addition of a computing node to the multi-node DBMS or removal of a computing node from the multi-node DBMS.

* * * * *